July 25, 1933.  C. A. SCHACHT  1,919,865

DISH SCRAPER

Filed Aug. 27, 1932

Clifford A. Schacht Inventor

By Alexander Powell

Attorneys

Patented July 25, 1933

1,919,865

UNITED STATES PATENT OFFICE

CLIFFORD A. SCHACHT, OF HUNTINGTON, INDIANA

DISH SCRAPER

Application filed August 27, 1932. Serial No. 630,728.

This invention is a novel improvement in dish or sink scrapers and the like, such as shown in my U. S. Letters Patent No. 1,647,751 dated November 1, 1927; and the principal object thereof is to provide a scraper having a flexible rubber blade and an integral reinforced rubber handle, the scraper being particularly adapted for use as a dish scraper, sink scraper, or the like.

Heretofore, scrapers have been used having flexible rubber blades, but the handles therefor have been made of metal, wood, or the like, attached to the blade by different methods and means, but such scrapers have been found unsatisfactory and unsanitary in that the handles eventually became loose or cut and tear the rubber blade; and moreover, it is almost impossible to keep the connection between the handle and the scraper free from dirt, grease, food, and other germ carrying mediums.

In my scraper, however, the handle and blade are molded simultaneously and integrally, the wire reinforcing material being inserted in the handle to stiffen same before molding. The wire reinforcement is provided at one end with a loop adapted to be embedded in the rear or thickened portion of the blade to impart a desired amount of stiffness to the rear portion of the blade while permitting the front edge of the blade to conform with the surface to be cleaned or scraped; and the opposite end of the wire reinforcement is flattened and formed into a non-circular shape to resist any tendency of the wire reinforcement from turning in the handle. The major portion of the blade having no reinforcement, readily conforms to the shape or curvature of the article to be scraped, and since the handle and blade are molded in one piece, and the wire reinforcement is entirely embedded within the handle, there are no joints or connections between the handle and the blade wherein dirt, grease, food, etc., might lodge. Moreover, there are no screws, nails, or rivets for attaching the handle to the blade.

My scraper can be easily cleaned; and is inexpensive to manufacture, the article being practically finished when it comes from the mold.

I will explain the invention with reference to the accompanying drawing, which illustrates several practical embodiments thereof to enable others to adopt and use the same, and will summarize in the claims the novel features of construction, and novel combinations of parts, for which protection is desired.

In said drawing:—

As shown, my novel scraper preferably comprises a rubber blade 1 slightly wedge-shaped or tapering from the thickened portion 1a adjacent the handle towards the blade edge; said blade being preferably semi-circular as shown, but may be made in any other desired shape, to suit the particular requirements for which the scraper is to be used.

Extending from the rear or thickened end of the blade is an integral rubber handle 2, preferably circular in cross-section as shown, but may be of any other desired cross-section, such as square, rectangular, or elliptical. On the outer end of the handle 2 is an integral perforated ear 2a, whereby the scraper may be suspended from a cord, nail, or other support, when not in use. Handle 2 is preferably integrally molded simultaneously with the blade 1, and the handle and blade are formed during the same molding process, whereby the scraper will be practically finished when taken from the mold.

Figure 1:
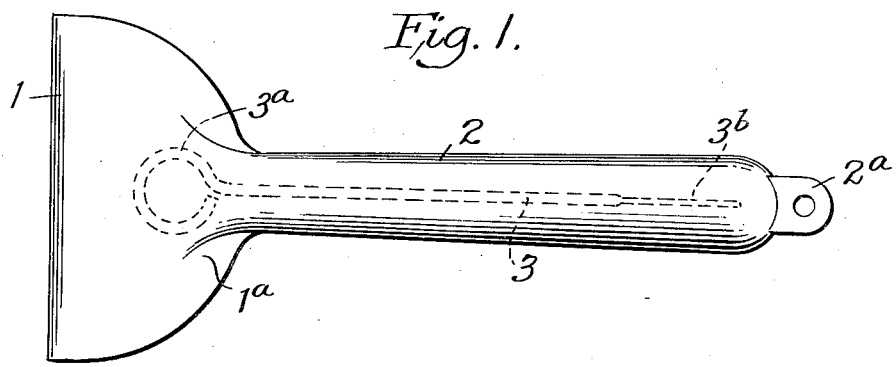
Fig. 1 is a front view of the scraper.
Figure 2:
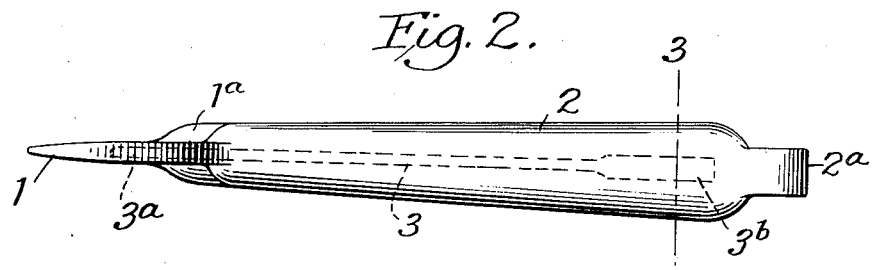
Fig. 2 is a side view thereof.
Figure 4:
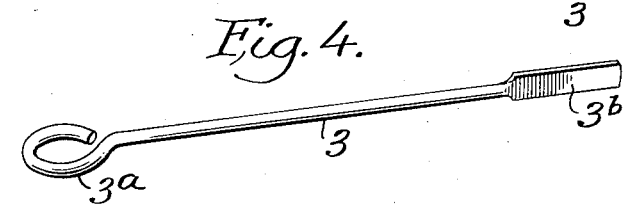
Fig. 4 is a perspective view of the wire reinforcement detached.
Figure 5:
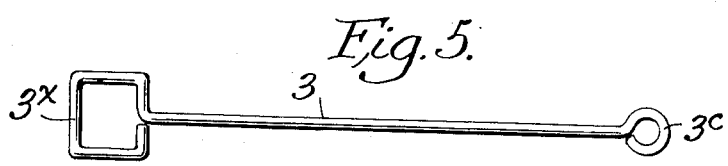
Fig. 5 shows a modification of the wire reinforcement.
Figure 3:
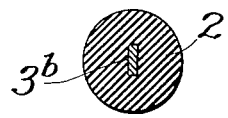
Fig. 3 is a section on the line 3—3 of Fig. 2.

In order to give the handle 2 the required stiffness, a reinforcing member 3 which is preferably a length of stiff wire, or the like, is embedded in the handle before the molding process, the wire extending the full length of the handle from the ear 2a, and extending slightly into the thicker rear end of the blade 1. At the end of the wire 3 adjacent the blade 1 is a loop 3a which extends well into the rear thickened portion of the blade 1 to stiffen the rear edge thereof and prevent the blade 1 from breaking off of the handle 2 when in use. Instead of a circular loop 3a other shapes such as an oblong 3x (Fig. 5) might be utilized, but the circular loop is the preferred embodiment.

The other end of the wire 3 is preferably flattened as at 3b to prevent the wire from turning in the handle. Instead of the flattened portion 3b a small loop 3c (Fig. 5) or the like may be utilized if desired, to give the same result. The size of loop 3a (or 3x) and the flattened portion 3b (or loop 3c) may be varied as desired. If desired, the reinforcing member 3 might be of material other than wire, or of any other desired cross-section; the reinforcing material or wire 3 being embedded in the handle before the molding process.

I preferably treat the wire 3 with acid before molding in the rubber to cause the rubber to adhere to the wire during the process of vulcanization so that the wire will not turn in the handle.

My novel dish scraper provides a sanitary one piece rubber scraper having an integral reinforced handle, and can be readily cleaned; and there are no joints or connections between the handle 2 and blade 1 wherein grease, dirt, or food may collect. Moreover, the scraper may be manufactured at a low cost, since the article is practically finished when it comes from the mold.

I claim:—

1. A scraper, comprising a rubber blade, and an integral handle; and a reinforcing non-flexible member of circular cross-section in the handle and having a portion of greater width than the diameter of the member extending into the blade.

2. A scraper of the character specified, comprising a rubber blade, an integral handle; and a reinforcing non-flexible wire in the handle and having a loop embedded in the blade.

3. A scraper of the character specified, comprising a rubber blade, an integral handle, and a reinforcing non-flexible wire in the handle and having a loop embedded in the blade; and means on the wire of greater width than the diameter of the wire and embedded in the handle for preventing turning of the member in the handle.

4. In a scraper as set forth in claim 3, said means comprising a non-circular loop on the member.

CLIFFORD A. SCHACHT.